(12) United States Patent
Xu et al.

(10) Patent No.: US 12,173,882 B2
(45) Date of Patent: Dec. 24, 2024

(54) LED LAMP

(71) Applicant: SHENZHEN SNC OPTO ELECTRONIC CO., LTD, Shenzhen (CN)

(72) Inventors: Jianyong Xu, Shenzhen (CN); Jianjun Xu, Shenzhen (CN); Liang Qiu, Shenzhen (CN); Chao Xu, Shenzhen (CN)

(73) Assignee: SHENZHEN SNC OPTO ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 18/214,535

(22) Filed: Jun. 27, 2023

(65) Prior Publication Data
US 2024/0151388 A1 May 9, 2024

(51) Int. Cl.
*F21V 29/70* (2015.01)
*A01G 7/04* (2006.01)
*F21S 4/28* (2016.01)
*F21V 5/00* (2018.01)
*F21V 17/12* (2006.01)
*F21V 31/00* (2006.01)
*F21Y 115/10* (2016.01)

(52) U.S. Cl.
CPC ............... *F21V 29/70* (2015.01); *F21S 4/28* (2016.01); *F21V 5/00* (2013.01); *F21V 17/12* (2013.01); *F21V 31/005* (2013.01); *A01G 7/045* (2013.01); *F21Y 2115/10* (2016.08)

(58) Field of Classification Search
CPC . F21V 29/70; F21V 5/00; F21V 17/12; F21V 31/005; F21S 4/28; A01G 7/045; F21Y 2115/10
See application file for complete search history.

(56) References Cited

U.S. PATENT DOCUMENTS

| | | | |
|---|---|---|---|
| 7,871,180 B2* | 1/2011 | Wu | F21V 15/013 362/217.13 |
| 8,092,045 B2* | 1/2012 | Xiao | F21V 29/70 362/249.02 |
| 9,726,331 B1* | 8/2017 | May | F21K 9/275 |
| 9,890,914 B2* | 2/2018 | Hannawa | F21V 21/005 |
| 9,964,289 B2* | 5/2018 | Pearson | F21V 23/06 |
| 10,794,580 B1* | 10/2020 | Su | F21S 4/28 |
| 11,015,776 B2* | 5/2021 | Gomez Martinez | F21S 8/043 |
| 11,118,777 B2* | 9/2021 | Wu | F21V 29/763 |
| 2012/0014108 A1* | 1/2012 | Greenfield | F21V 15/013 362/373 |

(Continued)

*Primary Examiner* — Tsion Tumebo

(57) ABSTRACT

An LED lamp includes a heat sink, a plurality of LED light boards, an LED driving power and a diffuser. The heat sink has a long hollow tubular structure. The heat sink includes a top plate and a plurality of mounting plates, and an angle is defined between two adjacent mounting plates. The LED light boards are arranged on outer surface of each mounting plate. The outer surface of the top plate is exposed to air. The diffuser covers all the LED light boards, and is connected with the heat sink. Two end covers are separately arranged on two ends of the heat sink. The LED lamp in the present disclosure has the advantages of compact structure, good heat dissipation effect, large luminous angle, good waterproof effect, convenient connection and so on.

17 Claims, 6 Drawing Sheets

(56) References Cited

U.S. PATENT DOCUMENTS

| | | | |
|---|---|---|---|
| 2014/0293595 A1* | 10/2014 | May | F21S 2/00 |
| | | | 362/217.05 |
| 2020/0196536 A1* | 6/2020 | Pasini | A01G 9/249 |
| 2021/0080065 A1* | 3/2021 | Brown | F21V 23/002 |
| 2021/0140625 A1* | 5/2021 | Holliger | F24F 13/078 |
| 2021/0199277 A1* | 7/2021 | Lu | F21V 27/02 |

* cited by examiner

LED LAMP

CROSS REFERENCE TO RELATED APPLICATIONS

This application claims priority to Chinese Patent Application No. 202211447602.2, entitled "LED LAMP" and filed on Nov. 8, 2022, the content of which is hereby incorporated by reference in its entirety.

TECHNICAL FIELD

The present disclosure belongs to the field of lighting devices, and more particularly to an LED lamp.

BACKGROUND

LED lamps have the advantages of energy saving, high brightness, convenient control and so on, and are widely used in various lighting places. LED plant growth lamps are one type of these. The LED plant growth lamps can be used to provide light required by photosynthesis of indoor plants.

The LED lamps usually include LED light board and power supply, both of which will produce a lot of heat, and will have high heat dissipation requirements, otherwise performance and service life of both will be affected. The heat dissipation effects of traditional LED plant growth lamps are not good. In addition, in order to save planting space and save the cost of the space, three-dimensional structures were adopted in many indoor planting places, to expand the plant area and improve the yield achieved under the same ground area. The traditional LED plant growth lamps generally use flat lighting, that is, have only one lighting surface, which will lead to that some plants located in the three-dimensional cannot get sufficient lighting, which will affect the growth of these plants. In addition, the existing LED plant growth lamps are large and occupy too much space, and thus the planting area of plants is reduced. Therefore, it is necessary to improve the existing LED lamps.

SUMMARY

The purpose of the present disclosure is to provide an LED lamp with a compact structure, having good heat dissipation effect and large luminous angle.

For the above purposes, technical proposals in the present disclosure can be:

An LED lamp includes: a heat sink, the heat sink having a long hollow tubular structure and comprising a top plate and a plurality of mounting plates, an angle being defined between two adjacent mounting plates, the outer surface of the top plate being exposed to air, each end of the heat sink arranging an end cover; a plurality of LED light boards, the LED light boards separately arranging on outer surface of the mounting plates; an LED driving power, the LED driving power being received in the heat sink; and a diffuser, the diffuser covering all the LED light boards and being connected with the heat sink.

In some embodiments, the plurality of mounting plates are a first side plate, a bottom plate and a second side plate separately; the bottom plate is opposite to the top plate; the first side plate is opposite to the second side plate; a slot is defined on the inner surface of each of the top plate and the bottom plate, or on the inner surface of each of the first side plate and the second side plate; a power fixing board is inserted in the slot, and the LED driving power is arranged on the power fixing board.

In some embodiments, the power fixing plate comprises a body; two opposite ends of the body are respectively stuck into the slots; the body comprises a first side surface and a second side surface opposite to the first side surface; the LED driving power is fixed on the first side surface, and a first gap is defined between the second side and perimeter walls of the heat sink.

In some embodiments, the power fixing plate further comprises a folding edge extending from the body; a screw hole is defined through the folding edge; the folding edge is connected with the perimeter walls of the heat sink through screws, and a ventilation hole is defined through the body.

In some embodiments, the diffuser comprises a cover wall and a convex edge protruding from the inner surface of the cover wall; the convex edge contacts with the perimeter wall of the heat sink, and a second gap is defined between the perimeter wall of the heat sink and the cover wall.

In some embodiments, the top plate of the heat sink is arranged adjacent to the first side plate and the second side plate; two card slots are separately defined on top portions of the first side plate and the second side plate; two buckles are separately arranged on two ends of the diffuser; each of the buckles is connected to and corresponding to one of the card slots.

In some embodiments, the card slot comprises a water baffle, and the gate of the card slot is located below the water baffle; the buckle comprises a water barrier arranged perpendicularly, the water baffle is located at the top portion of the buckle and in the inner side of the corresponding water barrier.

In some embodiments, the card slot is U-shaped, the buckle is tongue-shaped, and the buckle is received in the corresponding card slot.

In some embodiments, a cross section of the heat sink is square, a cross section of the diffuser is "U" shape; installation slots are separately defined on the outer surfaces of the mounting plates; the LED light board is fixed in the installation slot, and the LED light board is connected to the installation plate through screws; a reinforcement is arranged on the inner surface of the mounting plate corresponding to the screw; screw holes are defined in the reinforcement; fixed blocks are separately arranged on two ends of the LED light board, and each fixed block is connected to one installation slot with a buckle.

In some embodiments, the LED lamp is an LED plant growth lamp; a waterproof film is arranged between the heat sink and the end cover, and a waterproof connector is arranged in the middle of the end cover.

An LED lamp includes: a heat sink, the heat sink having a long hollow tubular structure and comprising a top plate, a first side plate, a bottom plate and a second side plate; the top plate being opposite to the bottom plate, and the first side plate being opposite to the second side plate; the outer surface of the top plate being exposed to air; each end of the heat sink arranging an end cover; a plurality of LED light boards, the LED light boards being arranged on surfaces of at least two of the first side plate, the bottom plate and the second side plate; an LED driving power, the LED driving power being received in the heat sink; and a diffuser, the diffuser covering all the LED light boards and being connected with the heat sink.

In some embodiments, a slot is defined on the inner surface of each of the top plate and the bottom plate, or on the inner surface of each of the first side plate and the second side plate; a power fixing board is inserted in the slot, and the LED driving power is arranged on the power fixing board; the power fixing plate comprises a body and a folding edge extending from the body; the two ends of the body are stuck in the slot; the body comprises a first side surface and a second side surface opposite to the first side surface; the LED driving power is fixed on the first side surface of the body; a ventilation hole is defined through the first side surface and the second side surface of the body; a first gap is defined between the second side surface and perimeter walls of the heat sink, and the folding edge is fixed on the perimeter wall of the heat sink.

In some embodiments, the diffuser comprises a cover wall and a plurality of convex edges protruding from the inner surface of the cover wall; the cover wall comprises a first side cover, a bottom cover and a second side cover; the first side cover is opposite to and spaced from the first side plate of the heat sink, the bottom cover is opposite to and spaced from the bottom plate, the second side cover is opposite to and spaced from the second side plate; then a second gap is defined between the cover wall and the first side plate, the bottom plate, the second side plate; the convex edges respectively contact with the perimeter wall of the heat sink.

In some embodiments, a first card slot is defined in the first side plate of the heat sink toward the top plate; a second card slot is defined in the second side plate of the heat sink toward the top plate; a first buckle is arranged on an end of the first side cover of the diffuser far from the bottom cover and a second buckle is arranged on an end of the second side cover far from the bottom cover; the first buckle is accommodated in the first card slot, and the second buckle is accommodated in the second card slot, then each of the buckles is connected with one of the card slots.

In some embodiments, the first card slot is U-shaped and defined in the first side plate along a direction away from the second side plate, and the second card slot is U-shaped and defined in the second side plate along a direction away from the first side plate; a gate of the first card slot faces away that of the second card slot; the first buckle is tongue-shaped and extending from the first side cover of the diffuser to the second side cover, and the second buckle is tongue-shaped and extending from the second side cover of the diffuser to the first side cover.

In some embodiments, the first card slot comprises a first slot plate close to the top plate and a second slot plate away from the top plate; the first slot plate and the second slot plate are roughly parallel; the first buckle contacts with the second slot plate; the second card slot comprises a third slot plate close to the top plate and a fourth slot plate away from the top plate; the third slot plate and the fourth slot plate are roughly parallel, and the second buckle contacts with the fourth slot plate.

In some embodiments, a first water baffle is arranged on an end of the first slot plate, and the first water baffle is L-shaped; the first water baffle is extending from the end of the first slot plate to the bottom plate and then extending toward the second side plate; a second water baffle is arranged on the end of the third slot plate, and the second water baffle is also L-shaped; the second water baffle is extending from the end of the third slot plate to the bottom plate and then extending toward the second side plate.

In some embodiments, a cross section of the heat sink is square, a cross section of the diffuser is "U" shape; an installation slot is defined in each of the outer surfaces of the mounting plates; the LED light board is fixed in the installation slot, and the LED light board is connected to the installation plate through screws; a reinforcement is arranged on the inner surface of the mounting plate corresponding to the screw; screw holes are defined in the reinforcement; a fixed block is arranged on each of two ends of the LED light board, and each fixed block is connected to one installation slot with a buckle.

In some embodiments, the LED lamp is an LED plant growth lamp, wherein a waterproof film is arranged between the heat sink and the end cover, and a waterproof connector is arranged in the end cover.

An LED plant growth lamp includes: a heat sink, the heat sink having a long hollow tubular structure and comprising a top plate, a first side plate, a bottom plate and a second side plate; the top plate being opposite to the bottom plate, and the first side plate being opposite to the second side plate; the outer surface of the top plate being exposed to air; each end of the heat sink arranging an end cover; a plurality of LED light boards, the LED light boards being arranged on surfaces of at least two of the first side plate, the bottom plate and the second side plate; an LED driving power, the LED driving power being received in the heat sink; and a diffuser, the diffuser covering all the LED light boards and being connected with the heat sink.

The LED lamp in the present disclosure has the advantages of compact structure, good heat dissipation effect, large luminous angle, good waterproof effect, convenient connection and so on.

It should be pointed out that the implementation of any product of the present disclosure does not need to achieve all the above effects at the same time.

BRIEF DESCRIPTION OF THE DRAWINGS

In order to more clearly illustrate the technical solutions of the embodiments of the present disclosure, the drawings used for illustrating the embodiments will be briefly described below. It should be understood that the following drawings merely illustrate some embodiments of the present disclosure. For those of ordinary skill in the art, other drawings can be obtained according to these drawings without any creative work.

DETAILED DESCRIPTION

Figure 1:
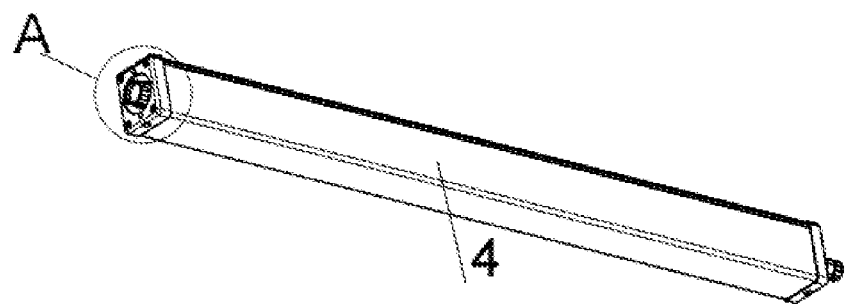
FIG. 1 illustrates a perspective view of an LED lamp according to an embodiment of the present disclosure.
Figure 2:
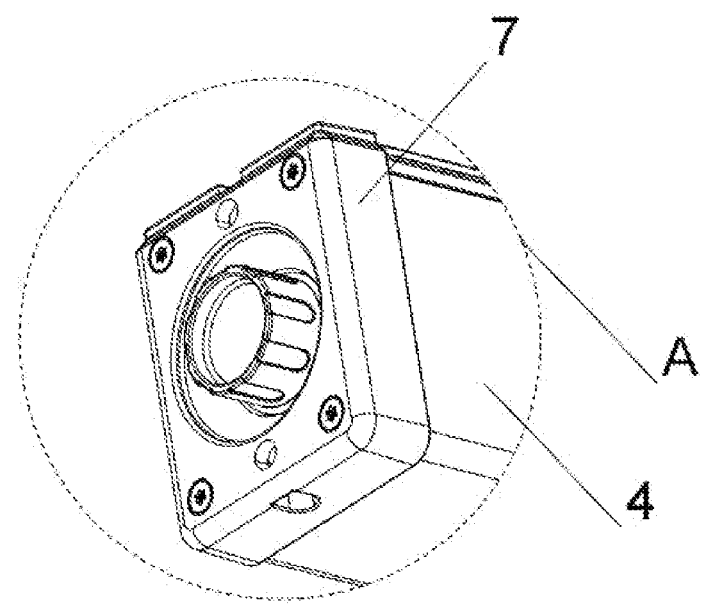
FIG. 2 illustrates a partial enlarged diagram on A of FIG. 1.
Figure 3:
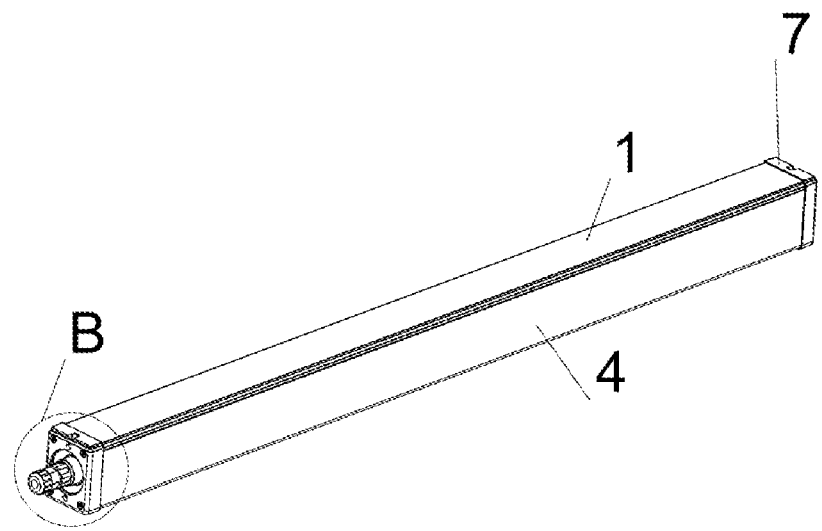
FIG. 3 illustrates a perspective view according to another angle of the LED lamp according to an embodiment of the present disclosure.
Figure 4:
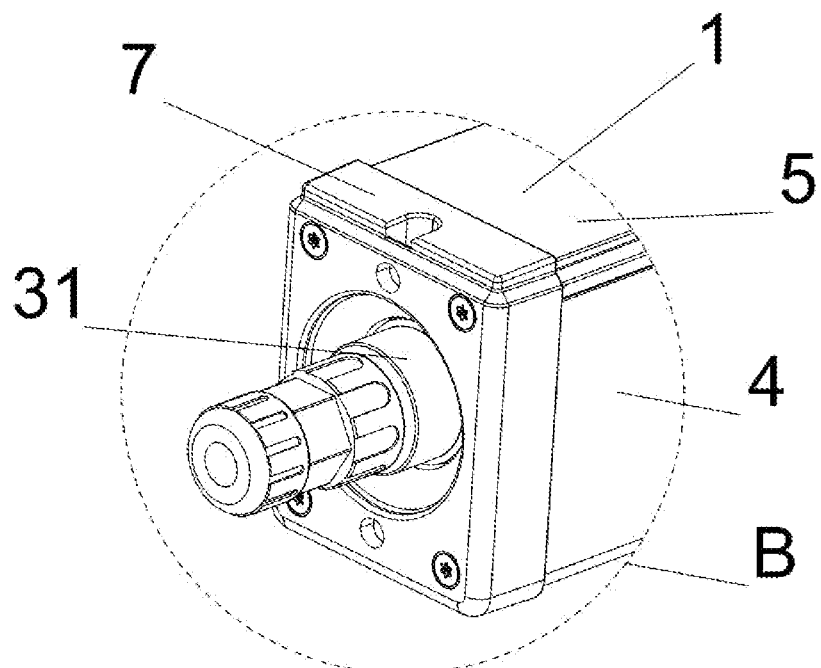
FIG. 4 illustrates a partial enlarged diagram on B of FIG. 3.

In order to make the objects, technical solutions and advantages of the present disclosure clearer, the embodiments of the present disclosure will be further described in detail below with reference to the accompanying drawings. It should be understood that the specific embodiments described herein are only used to explain the present disclosure and do not limit the scope of protection of the present disclosure.

Referring to the embodiment of the present disclosure shown in FIG. 1 to FIG. 13, an LED lamp includes a heat sink 1, a plurality of LED light boards 2, an LED driving power 3 and a diffuser 4. The heat sink 1 is a long hollow tubular structure. The heat sink 1 includes a top plate 5 and a plurality of mounting plates 6, and an angle is defined between two adjacent mounting plates 6. The LED light boards 2 are arranged on outer surface of each mounting plate 6. The outer surface of the top plate 5 is exposed to air. The LED driving power 3 is received in the heat sink 1. The diffuser 4 covers all the LED light boards 2, and is connected to the heat sink 1. Two end covers 7 are separately arranged on two ends of the heat sink 1. Since the heat sink 1 has a plurality of mounting plates 6, and an angle is defined between the adjacent two mounting plates 6, a plurality of LED light boards 2 with different lighting angle can be installed, and the luminous angle and the irradiation area of the LED lamp can be improved. In addition, the top plate of the heat sink 1 directly contacts to the outside air, which can improve the heat dissipation effect of heat sink 1. The diffuser 4 can improve the water resistance of the LED lamp, thus the LED lamp is especially suitable for humid place planting such as indoor plant planting. Further, the end covers 7 can also improve the water resistance of the LED lamp.

In some embodiments, as shown in FIG. 5 to FIG. 13, the heat sink 1 includes the top plate 5 and three successively connected mounting plates 6. An angle is defined between two adjacent mounting plates 6, and an LED light board 2 is respectively installed on the outer surface of each of the mounting plates 6. Since the heat sink 1 is provided with three mounting plates 6, and the angle is defined between the two adjacent mounting plates 6, then the LED light boards 2 totally adopting three luminous angles can be installed, which can improve the luminous angle and irradiation area of the LED lamp. It is understood that the numbers of mounting plates 6 are not limited to this embodiment, and can also be two or more than three, such as four, five and so on. It is understood that a plurality of the mounting plates 6 can be connected directly, and can also be set at intervals. All of the outer surface of the heat sink 1 can be installed with LED light boards except the top plate 5, or, some of the outer surface of the heat sink 1 can be installed with LED light boards except the top plate 5. It can be understood that the angle between the two adjacent mounting plates 6 can be an acute angle, an obtuse angle or a right angle. The following are three mounting plates 6 connected in turn as an example.

In some embodiments, as shown in FIG. 5 to FIG. 10, the three mounting plates 6 respectively are a first side plate 8, a bottom plate 9 and a second side plate 10 connected sequentially. An angle of 90 degrees is defined between the two adjacent mounting plates 6, that is, the heat sink 1 has a hollow cuboid tubular structure. The bottom plate 9 is opposite to the top plate 5, the first side plate 8 is opposite to the second side plate 10, and the top plate 5 is adjacent to the first side plate 8 and the second side plate 10. Three LED light boards 2 are separately arranged on outer surface of the first side plate 8, the bottom plate 9 and the second side plate 10, and thus, the LED lamp can realize the irradiation on left, right and below, and further can obtain a large luminous angle and a large irradiation area.

In some embodiments, the LED driving power 3 can be fixed to the heat sink 1 by fasteners.

Figure 8:
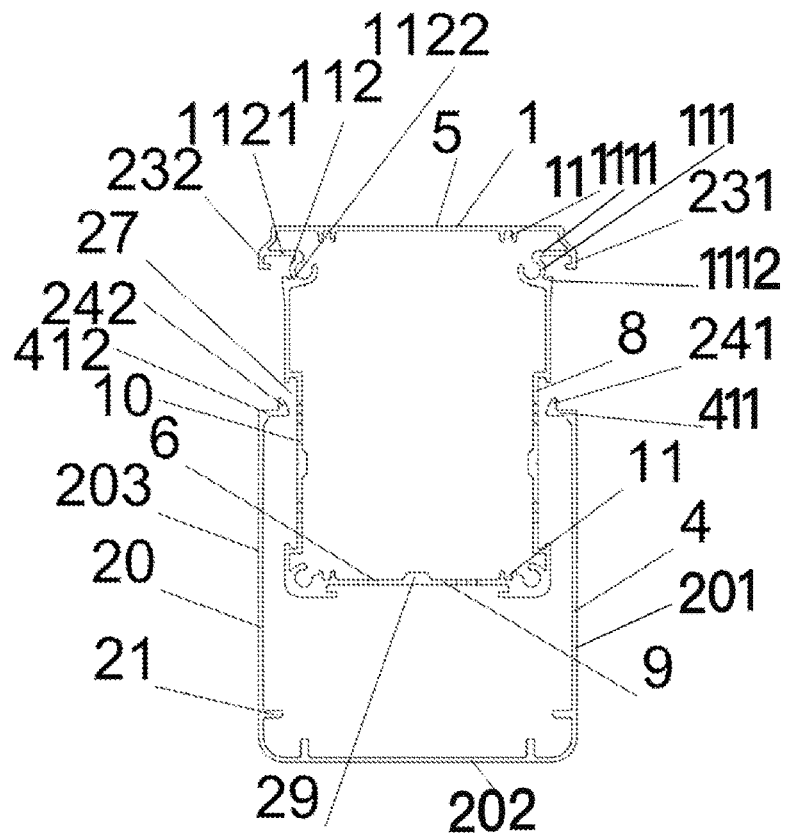
FIG. 8 illustrates an explosion diagram of a heat sink and a light shield according to an embodiment of present disclosure.
Figure 9:
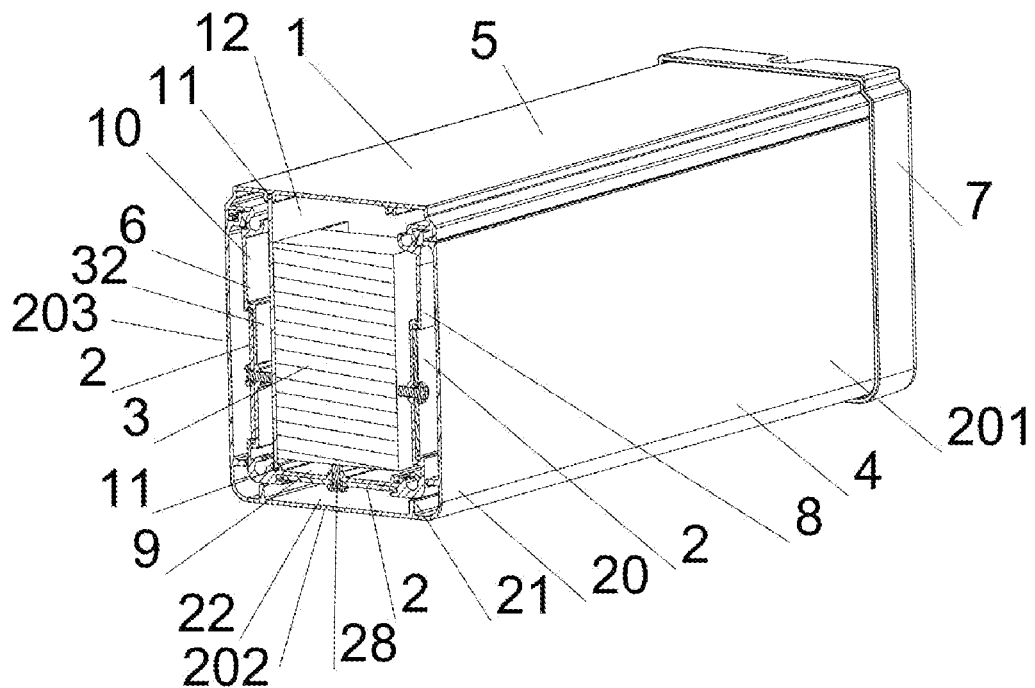
FIG. 9 illustrates a section diagram according to an angle of an LED lamp according to an embodiment of present disclosure.
Figure 10:
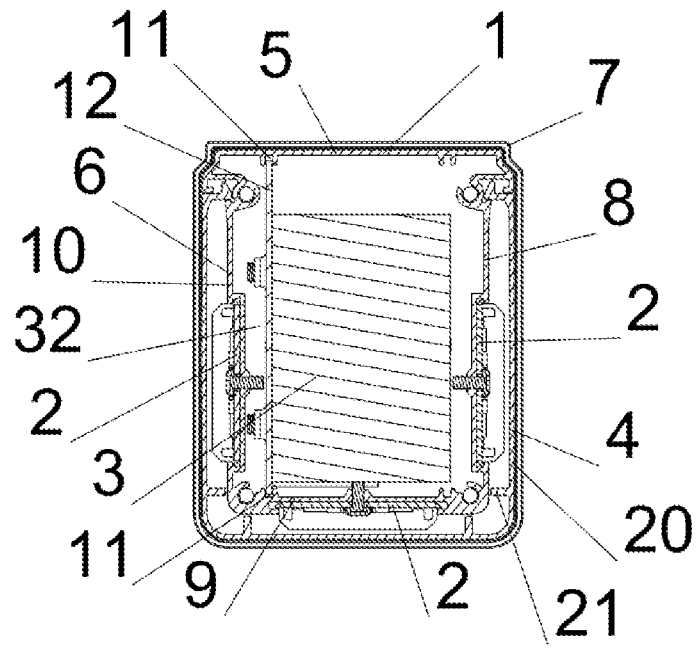
FIG. 10 illustrates a section diagram according to another angle of the LED lamp according to an embodiment of present disclosure.
Figure 11:
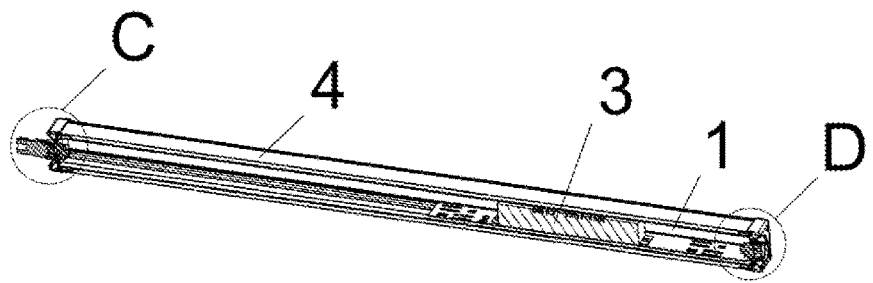
FIG. 11 illustrates a section diagram according to the other angle of the LED lamp according to an embodiment of present disclosure.
Figure 12:
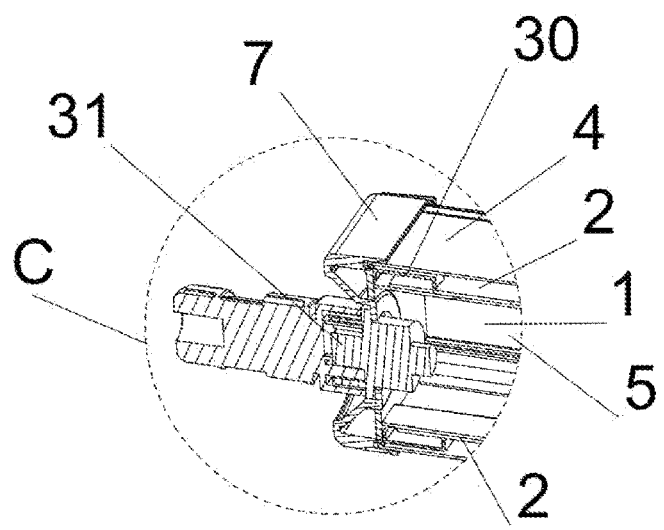
FIG. 12 illustrates a partial enlarged diagram on C of FIG. 11.
Figure 13:
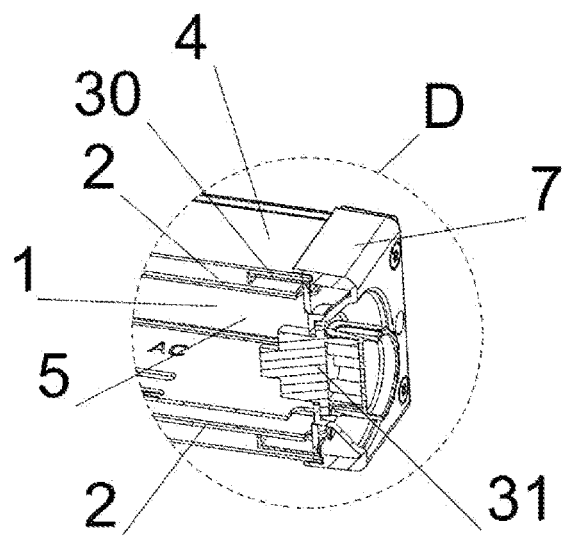
FIG. 13 illustrates a partial enlarged diagram on D of FIG. 11.

In some embodiments, as shown in FIG. 8 to FIG. 10, the inner surface of the top plate 5 and the inner surface of the bottom plate 9 are respectively provided with a slot 11. Each slot 11 is inserted with a power fixing board 12, the LED driving power 3 is installed on the power fixing boards 12, and thus the LED driving power 3 is fixed on the heat sink 1 through the power fixing boards 12 and the slots 11. This structure can realize a compact structure of the LED lamp, and the heat generated by the LED driving power 3 can also be transferred to the heat sink 1 through the power fixed board 12, to ensure the radiation effect of the LED driving power 3.

Specifically, in some embodiments, as shown in FIG. 8 to FIG. 10, the slot 11 located on the top plate 5 is defined between two first ribs 51 convex on the inner surface of the top plate 5. The extension direction of the two first ribs 51 is consistent with the long direction of the heat sink 1. In this embodiment, the two first ribs 51 are integrated with the top plate 5. In other embodiments, the two first ribs 51 may also be installed on the top plate 5. The slot 11 located on the bottom plate 9 is defined between two second ribs 91 convex on the inner surface of the bottom plate 9. The extension direction of the two second ribs 91 is consistent with the long direction of the heat sink 1. In this embodiment, the two second ribs 91 are integrated with the bottom plate 9. In other embodiments, the two second ribs 91 may also be installed on the bottom plate 9. Of course, in other embodiments, the slots 11 may also be depressions formed directly into the interiors of the top plate 5 and the bottom plate 9. In this embodiment, the slots 11 are positioned adjacent to the first side plate 8, and in other embodiments, the slots 11 can also be positioned adjacent to the second side plate 10, as long as sufficient space is left to install the device inside the heat sink 1. The following embodiments are illustrated by the slots 11 adjacent to the first side plate 8 as an example.

Figure 5:
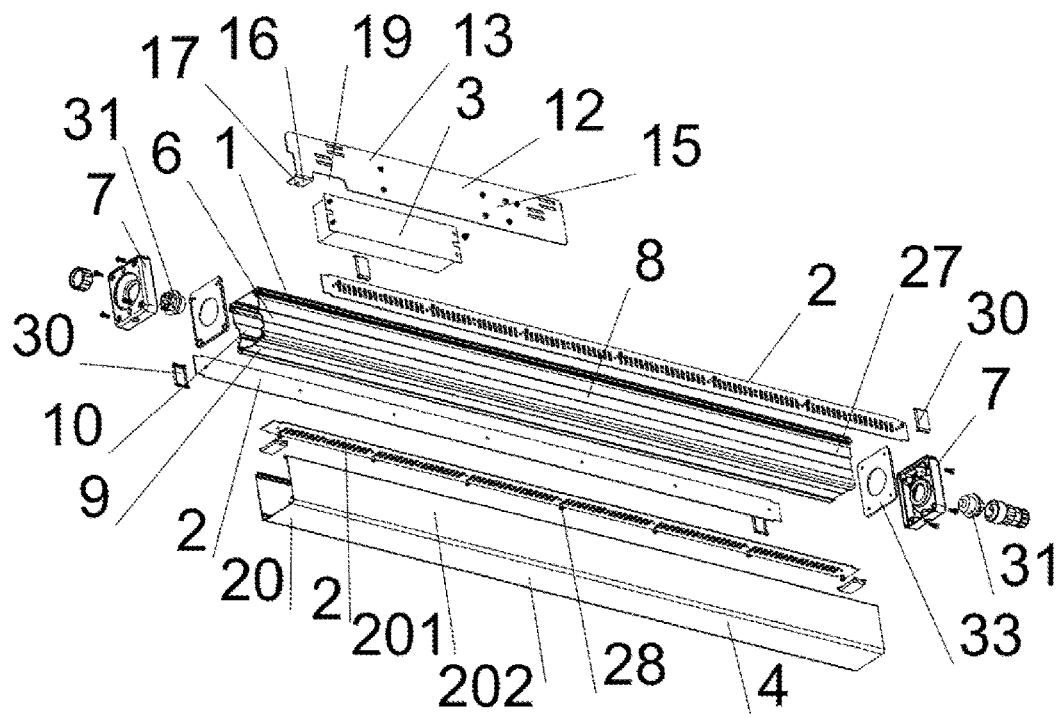
FIG. 5 illustrates an explosion diagram of an LED lamp according to an embodiment of the present disclosure.
Figure 6:
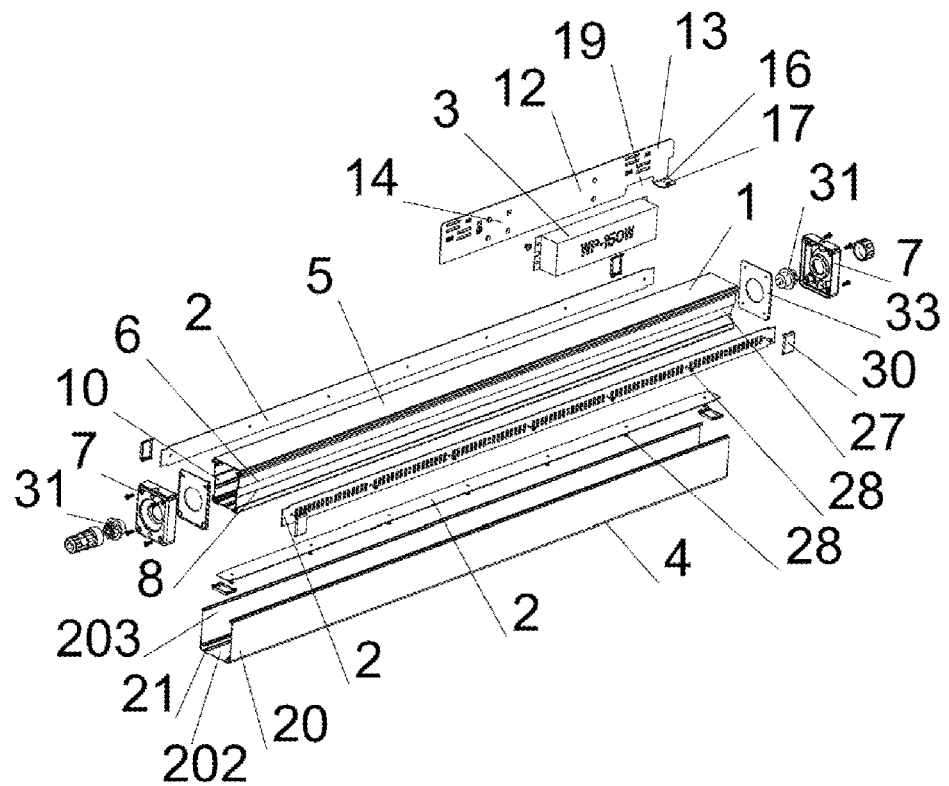
FIG. 6 illustrates an explosion diagram according to another angle of the LED lamp according to an embodiment of the present disclosure.
Figure 7:
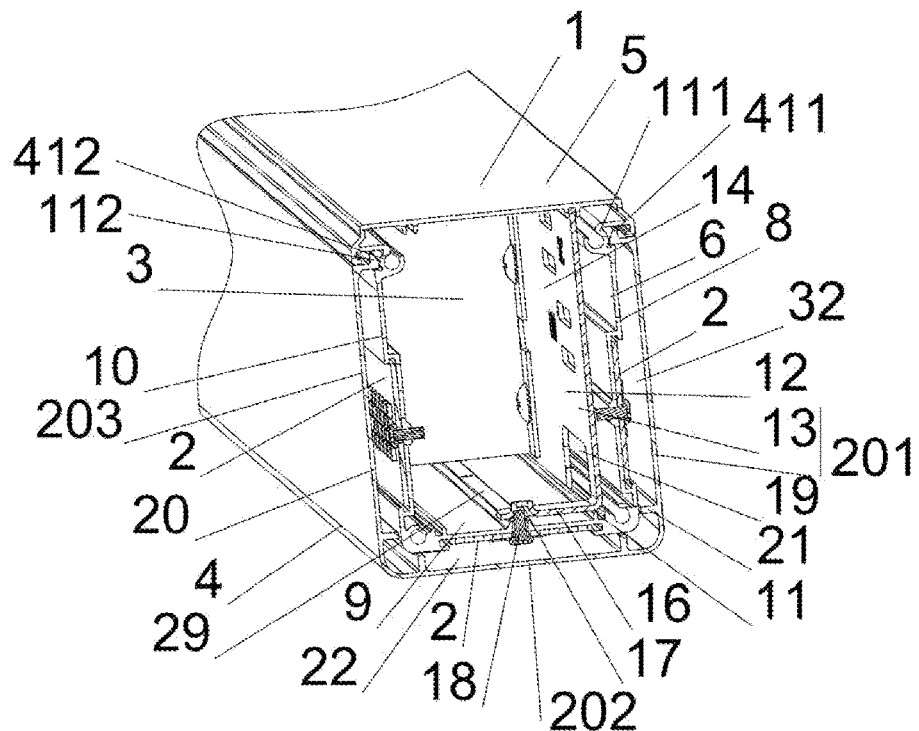
FIG. 7 illustrates a section diagram of an LED lamp according to an embodiment of present disclosure.

In some embodiments, as shown in FIG. 5 to FIG. 7, the power fixing board 12 includes a body 13. The body 13 is roughly flat-like, and two opposite ends of the body 13 are respectively stuck into the slots 11 which are arranged on the top plate 5 and the bottom plate 9. A gap is defined between the body 13 and walls of the heat sink 1. Specifically, in this embodiment, the body 13 includes a first side surface 14 and a second side surface 15 opposite to the first side surface 14. The second side surface 15 is closer to the first side plate 8 than the first side surface 14. The LED driving power 3 is fixed on the first side surface 14. A first gap 32 is defined between the second side surface 15 and the first side plate 8 of the heat sink 1. By setting the first gap 32, the heat generated by the LED driving power 3 and the LED light board 2 can not affect each other, and that is conducive to flowing the air inside the heat sink 1 to take away the heat generated by the LED driving power 3 and the LED light board 2.

In some embodiments, as shown in FIG. 5 to FIG. 7, the power fixing board 12 also includes a folding edge 16. The folding edge 16 is perpendicularly extended from an end of the body 13 close to the bottom plate 9, along a direction away from the first side plate 8. Fasteners arranged on the folding edge 16 can fix the power fixing board 12 with the bottom plate 9. In this embodiment, a plurality of screw holes 17 are defined through the folding edge 16, and the folding edge 16 is fixedly connected to the bottom plate 9 of the heat sink 1 by a plurality of first screws 18 fitting with the screw holes 17. The folding edge 16 can realize the fixed connection between the power fixing board 12 and the heat sink 1. The folding edge 16 and the LED driving power 3 are located on the same side of the body 13. The folding edge 16 can strengthen the strength of the power fixing board 12, and can prevent the power fixing board 12 from deformation and releasing from the slots 11 due to overweight of the LED driving power 3.

In some embodiments, as shown in FIG. 5 to FIG. 7, a ventilation hole 19 is defined through the body 13. The ventilation hole 19 is conducive to flowing air inside the heat sink 1, and thus the heat generated by the LED driving power 3 can be better taken away. The ventilation hole 19 can be one or more, and the ventilation hole 19 can be located in the middle position or edge position of the body 13. In this embodiment, as shown in FIG. 5 to FIG. 7, the ventilation hole 19 is located at the edge of the body 13 toward the bottom plate 9 and is close to the folding edge 16.

In other embodiments, the slots 11 can also be arranged on the inner surfaces of the first side board 8 and the second side board 10, and similarly, the power fixing board 12 is inserted in the slot 11, and the LED driving power 3 is installed on the power fixing board 12. Settings of the power fixing board 12 can be referred to the above embodiments, which will not be repeated here.

In some embodiments, as shown in FIG. 1 to FIG. 13, the diffuser 4 covers all the LED light boards 2, that is, the diffuser 4 surrounds the LED light boards 2 on surfaces of the first side board 8, the bottom board 9 and the second side board 10 respectively. In this embodiment, the cross section of the heat sink 1 is square, and the cross section of the diffuser 4 is "U" shape, so as to better fit.

In some embodiments, as shown in FIG. 5 to FIG. 10, the diffuser 4 includes a cover wall 20 and a plurality of convex edges 21 protruding from the inner surface of the cover wall 20. The cover wall 20 includes a first side cover 201, a bottom cover 202 and a second side cover 203. The first side cover 201 is opposite to and spaced from the first side plate 8 of the heat sink 1. The bottom cover 202 is opposite to and spaced from the bottom plate 9. The second side cover 203 is opposite to and spaced from the second side plate 10. A second gap 22 is defined between the cover wall 20 and the first side plate 8, the bottom plate 9, and the second side plate 10. The second gap 22 can prevent the diffuser 4 from deformation and aging due to the heat of the LED light boards 2. A plurality of flanges 21 are arranged to contact with the first side plate 8, the bottom plate 9 and the second side plate 10 of the heat sink 1. The flanges 21 can prevent the diffuser 4 from deformation caused by pile pressure in the process of transportation or storage due to existence of the second gap 22.

The heat sink 1 and the diffuser 4 can be connected by a buckle. A card slot can be defined on each top portion of the first side plate 8 and the second side plate 10; a buckle can be arranged on each top end of the diffuser 4; each buckle can be connected with one card slot. In some specific embodiments, as shown in FIG. 7 and FIG. 8, a first card slot 111 is defined in the first side plate 8 of the heat sink 1 adjacent to the top plate 5, and a second card slot 112 is defined in the second side plate 10 of the heat sink 1 adjacent to the top plate 5. A first buckle 411 is arranged on an end of the first side cover 201 of the diffuser 4 away from the bottom cover 202, and a second buckle 412 is defined on an end of the second side cover 203 away from the bottom cover 202. The first buckle 411 can be accommodated in the first card slot 111, and the second buckle 412 can be accommodated in the second card slot 112. Each buckle is connected with one card slot, and thus the LED lamp is compact, and the installation between the heat sink 1 and the diffuser 4 is convenient. Of course, the card slot can also be arranged on the diffuser 4, and the buckle is arranged on the heat sink 1.

In some embodiments, as shown in FIG. 7 and FIG. 8, the first card slot 111 is a U-shaped slot and extending from the first side plate 8 along a direction away from the second side plate 10, and the second card slot 112 is a U-shaped slot and extending from the second side plate 10 along a direction away from the first side plate 8. A gate of the first card slot 111 and a gate of the second card slot 112 are faced away from each other. The first buckle 411 is tongue-shaped and extending along a direction from the first side cover 201 of the diffuser 4 to the second side cover 203. The second buckle 412 is tongue-shaped and extending along a direction from the second side cover 203 to the first side cover 201. The two U-shaped slots respectively correspond to the two tongue-shaped buckles, each tongue-shaped buckle can be accommodated in one corresponding U-shaped slot, and thus the heat sink 1 and the diffuser 4 are connected.

Each card slot can include a water baffle, and the gate of the card slot can be located below the water baffle. In some specific embodiments, as shown in FIG. 7 and FIG. 8, the first card slot 111 includes a first slot plate 1111 arranged near to the top plate 5 and a second slot plate 1112 arranged away from the top plate 5. The first slot plate 1111 is substantially parallel to the second slot plate 1112 and the end of the second slot plate 1112 facing to the first side cover 201 is folded toward the first slot plate 1111. The first buckle 411 contacts with and is buckled to the second slot plate 1112. A first water baffle 231 is arranged on the end of the first slot plate 1111. The first water baffle 231 is L-shaped, and extending from the end of the first slot plate 1111 to the bottom plate 6 and then folding toward the second side plate 10, to make the gate contraction. The second card slot 112 includes a third slot plate 1121 arranged near to the top plate 5 and a fourth slot plate 1122 arranged away from the top plate 5. The third slot plate 1121 is substantially parallel to the fourth slot plate 1122 and the end of the fourth slot plate 1122 facing to the second side cover 203 is folded toward the third slot plate 1121. The second buckle 412 contacts with and is buckled to the fourth slot plate 1122. A second water baffle 232 is arranged on the end of the third slot plate 1121. The second water baffle 232 is also L-shaped and extending from the end of the third slot plate 1121 to the bottom plate 6 and then folding toward the second side plate 10, to make the gate contraction. The first water baffle 231 and the second water baffle 232 can prevent the water from flowing down from the top plate 5 of the heat sink 1 into the interior of the diffuser 4, to achieve waterproof effect.

Each buckle can include a water barrier arranged perpendicularly, and the water barrier is located at the top portion of the buckle. Each water barrier is corresponding to one water baffle on one card slot and is located on inner side of the corresponding water baffle. In some specific embodiments, as shown in FIG. 7 and FIG. 8, a first water barrier 241 is arranged on the end of the first buckle 411 away from the first side cover 201 and extending along a direction away from the bottom cover 202. The first water barrier 241 is located in the first card slot 111. A second water barrier 242 is arranged on the end of the second buckle 412 away from the second side cover 203 and extending along a direction away from the bottom cover 202. The second water barrier 242 is located in the second card slot 112. The first water barrier 241 and the second water barrier 242 can further prevent the water from flowing down from the top plate 5 of the heat sink 1 into the interior of the diffuser 4, to achieve waterproof effect.

It can be understood that when the first buckle 411 is accommodated in the first card slot 111, the second slot plate 1112 of the first card slot 111 can support the first buckle 411; when the second buckle 412 is accommodated in the second card slot 112, the fourth slot plate 1122 of the second card slot 112 can support the second buckle 412.

In some embodiments, as shown in FIG. 5, FIG. 6 and FIG. 8, a mounting slot 27 is defined on the outer surface of each mounting plate 6; each LED light board 2 is fixed in one mounting slot 27; and each LED light board 2 is connected to one mounting plate 6 through the second screw 28. A reinforcing rib 29 is arranged on the inner surface of the mounting plate 6 corresponding to the second screw 28. The screw hole 17 is defined on the reinforcing rib 29. Two fixed blocks 30 are separately arranged on two ends of the LED light board 2, and each fixed block 30 is connected with one mounting slot 27 through a buckle.

In some embodiments, as shown in FIGS. 1 to 6 and FIGS. 9 to 13, a waterproof film 33 is arranged between the heat sink 1 and each end cover 7, and thus both sides of the lamp body can achieve waterproof effect. A waterproof connector 31 is housed inside each end cover 7 and then multiple LED plant growth lamps can be conveniently connected by the waterproof connector 31.

The LED lamp is provided with a content control program, which can control the LED lamp emitting full spectrum, indoor spectrum, greenhouse spectrum, or red spectrum.

The LED lamp in the above embodiments have the advantages of compact structure, good heat dissipation, large luminous angle, good waterproof effect, convenient connection and so on.

The technical characteristics of the above embodiments can be randomly combined. For concise description, all possible combinations of the technical characteristics in the above embodiments have not been described. However, as long as there is no contradiction in the combinations of these technical characteristics, it should be considered to be the scope of this specification.

The above embodiments only express several embodiments of the present disclosure, and their descriptions are more specific and detailed, but they cannot therefore be understood as constraints on the scope of the present disclosure patent. It should be pointed out that, for ordinary technical personnel in the field, under the premise of not deviating from the concept of the present disclosure, a number of deformation and improvement can be made, which all belong to the scope of protection of the present disclosure. Therefore, the scope of protection of the present disclosure patent shall be subject to the attached claims.

It needs to be noted that, when the element is said to be "arranged in", "fixed in" another element, it can be directly or indirectly on the other element. When a component is said to be "fixed to" another component, or "fixedly connected" to another component, it may be in either a detachable or non-detachable fix mode. When a component is said to be "connected" to another component, it may be directly connected or indirectly connected to another component. The terms "vertical", "horizontal", "left", "right", "up", "down", and similar expressions used in this article are for illustrative purposes only and are not meant to be the only embodiment.

Unless otherwise defined, all technical and scientific terms used herein have the same meaning as would normally be understood by a technician in the technical field belonging to the present disclosure. The terms used in the specification of the present disclosure herein are only for the purpose of describing the specific embodiments and are not intended to constrain the present disclosure. The term "and/or" used herein includes any and all combinations of one or more related listed items.

The "first", "second", "third" and other similar terms in the present disclosure do not represent the specific quantity and sequence, but are only used for the distinction of names.

It should also be understood that, in interpreting the element, although not explicitly described, the element is interpreted to include a margin of error which shall be within the acceptable deviation of a particular value determined by a skilled person in the field. For example, "approximately", "approximately", or "substantially" may mean within one or more standard deviations and are not qualified here.

What is claimed is:

1. An LED lamp, comprising: a heat sink, the heat sink having a long hollow tubular structure and comprising a top plate and a plurality of mounting plates, an angle being defined between two adjacent mounting plates, the outer surface of the top plate being exposed to air, each end of the heat sink arranging an end cover; a plurality of LED light boards, the LED light boards separately arranging on outer surface of the mounting plates; an LED driving power, the LED driving power being received in the heat sink; and a diffuser, the diffuser covering all the LED light boards and being connected with the heat sink; wherein the plurality of mounting plates are a first side plate, a bottom plate and a second side plate separately; the bottom plate is opposite to the top plate; the first side plate is opposite to the second side plate; the bottom plate comprises an inner surface faced to the top plate, the top plate comprises an inner surface faced to the bottom plate, the first side plate comprises an inner surface faced to the second side plate, the second side plate comprises an inner surface faced to the first side plate; a slot is defined on the inner surface of each of the top plate and the bottom plate, or on the inner surface of each of the first side plate and the second side plate; a power fixing board is inserted in the slot, and the LED driving power is arranged on the power fixing board, wherein the power fixing board comprises a body; two opposite ends of the body are respectively stuck into the slots; the body comprises a first side surface and a second side surface opposite to the first side surface, the second side surface is closer to walls of the hear sink than the first side surface; the LED driving power is fixed on the first side surface, and a first gap is defined between the second side and perimeter walls of the heat sink.

2. An LED lamp of claim 1, wherein the power fixing board further comprises a folding edge extending from the body; a screw hole is defined through the folding edge; the folding edge is connected with the perimeter walls of the heat sink through screws, and a ventilation hole is defined through the body.

3. An LED lamp of claim 1, wherein the diffuser comprises a cover wall and a convex edge protruding from the inner surface of the cover wall; the convex edge contacts with the perimeter wall of the heat sink, and a second gap is defined between the perimeter wall of the heat sink and the cover wall.

4. An LED lamp of claim 1, wherein the top plate of the heat sink is arranged adjacent to the first side plate and the second side plate; two card slots are separately defined on top portions of the first side plate and the second side plate; two buckles are separately arranged on two ends of the diffuser; each of the buckles is connected to and corresponding to one of the card slots.

5. An LED lamp of claim 4, wherein the card slot comprises a water baffle, and the gate of the card slot is located below the water baffle; the buckle comprises a water barrier arranged vertically, the water baffle is located at the top portion of the buckle and in the inner side of the corresponding water barrier.

6. An LED lamp of claim 4, wherein the card slot is U-shaped, the buckle is tongue-shaped, and the buckle is received in the corresponding card slot.

7. An LED lamp of claim 3, wherein a cross section of the heat sink is square, a cross section of the diffuser is "U" shape; installation slots are separately defined on the outer surfaces of the mounting plates; the LED light board is fixed in the installation slot, and the LED light board is connected to the installation plate through screws; a reinforcement is arranged on the inner surface of the mounting plate corresponding to the screw; screw holes is defined in the reinforcement; fixed blocks are separately arranged on two ends of the LED light board, and each fixed block is connected to one installation slot with a buckle.

8. An LED lamp of claim 1, wherein the LED lamp is an LED plant growth lamp; a waterproof film is arranged between the heat sink and the end cover, and a waterproof connector is arranged in the middle of the end cover.

9. An LED lamp comprising: a heat sink, the heat sink having a long hollow tubular structure and comprising a top plate, a first side plate, a bottom plate and a second side plate; the top plate being opposite to the bottom plate, and the first side plate being opposite to the second side plate; the outer surface of the top plate being exposed to air; each end of the heat sink arranging an end cover; a plurality of LED light boards, the LED light boards being arranged on surfaces of at least two of the first side plate, the bottom plate and the second side plate; an LED driving power, the LED driving power being received in the heat sink; and a diffuser, the diffuser covering all the LED light boards and being connected with the heat sink; wherein a slot is defined on the inner surface of each of the top plate and the bottom plate, or on the inner surface of each of the first side plate and the second side plate; a power fixing board is inserted in the slot, and the LED driving power is arranged on the power fixing board; the power fixing board comprises a body and a folding edge vertically extending from the body; the two ends of the body are stuck in the slot; the body comprises a first side surface and a second side surface opposite to the first side surface, the second side surface is closer to walls of the hear sink than the first side surface; the LED driving power is fixed on the first side surface of the body; a ventilation hole is defined through the first side surface and the second side surface of the body; a first gap is defined between the second side surface and perimeter walls of the heat sink, and the folding edge is fixed on the perimeter wall of the heat sink.

10. An LED lamp of claim 9, wherein the diffuser comprises a cover wall and a plurality of convex edges protruding from the inner surface of the cover wall; the cover wall comprises a first side cover, a bottom cover and a second side cover; the first side cover is opposite to and spaced from the first side plate of the heat sink, the bottom cover is opposite to and spaced from the bottom plate, the second side cover is opposite to and spaced from the second side plate; then a second gap is defined between the cover wall and the first side plate, the bottom plate, the second side plate; the convex edges respectively contact with the perimeter wall of the heat sink.

11. An LED lamp of claim 9, wherein a first card slot is defined in the first side plate of the heat sink toward the top plate; a second card slot is defined in the second side plate of the heat sink toward the top plate; a first buckle is arranged on end of the first side cover of the diffuser far from the bottom cover and a second buckle is arranged on end of the second side cover far from the bottom cover; the first buckle is accommodated in the first card slot, and the second buckle is accommodated in the second card slot, then each of the buckle is connected with one of the card slots.

12. An LED lamp of claim 11, wherein the first card slot is U-shaped and defined in the first side plate along a direction of away from the second side plate, and the second card slot is U-shaped and defined in the second side plate along a direction of away from the first side plate; a gate of the first card slot faces away that of the second card slot; the first buckle is tounge-shaped and extending from the first side cover of the diffuser to the second side cover, and the second buckle is tounge-shaped and extending from the second side cover of the diffuser to the first side cover.

13. An LED lamp of claim 11, wherein the first card slot comprises a first slot plate closed to the top plate and a second slot plate away from the top plate; the first slot plate and the second slot plate is roughly parallel; the first buckle contacts with the second slot plate; the second card slot comprises a third slot plate close to the top plate and a fourth slot plate away from the top plate; the third slot plate and the fourth slot plate is roughly parallel, and the second buckle contacts with the fourth slot plate.

14. An LED lamp of claim 13, wherein a first water baffle is arranged on an end of the first slot plate, and the first water baffle is L-shaped; the first water baffle is extending from the end of the first slot plate to the bottom plate and then extending toward the second side plate; a second water baffle is arranged on the end of the third slot plate, and the second water baffle is also L-shaped; the second water baffle is extending from the end of the third slot plate to the bottom plate and then extending toward the second side plate.

15. An LED lamp of claim 9, wherein a cross section of the heat sink is square, a cross section of the diffuser is "U" shape; an installation slot is defined in each of the outer surfaces of the mounting plates; the LED light board is fixed in the installation slot, and the LED light board is connected to the installation plate through screws; a reinforcement is arranged on the inner surface of the mounting plate corresponding to the screw; screw holes is defined in the reinforcement; a fixed block is arranged on each of two ends of the LED light board, and each fixed block is connected to one installation slot with a buckle.

16. An LED lamp of claim 9, wherein the LED lamp is an LED plant growth lamp, wherein a waterproof film is arranged between the heat sink and the end cover, and a waterproof connector is arranged in the end cover.

17. An LED lamp, comprising: a heat sink, the heat sink having a long hollow tubular structure and comprising a top plate, a first side plate, a bottom plate and a second side plate; the top plate being opposite to the bottom plate, and the first side plate being opposite to the second side plate; the outer surface of the top plate being exposed to air; each end of the heat sink arranging an end cover; a plurality of LED light boards, the LED light boards being arranged on surfaces of at least two of the first side plate, the bottom plate and the second side plate; an LED driving power, the LED driving power being received in the heat sink; and a diffuser, the diffuser covering all the LED light boards and being connected with the heat sink; wherein the plurality of mounting plates are a first side plate, a bottom plate and a second side plate separately; the bottom plate is opposite to the top plate; the first side plate is opposite to the second side plate; the bottom plate comprises an inner surface faced to the top plate, the top plate comprises an inner surface faced to the bottom plate, the first side plate comprises an inner surface faced to the second side plate, the second side plate comprises an inner surface faced to the first side plate; a slot is defined on the inner surface of each of the top plate and the bottom plate, or on the inner surface of each of the first side plate and the second side plate; a power fixing board is inserted in the slot, and the LED driving power is arranged on the power fixing board, wherein the power fixing board comprises a body; two opposite ends of the body are respectively stuck into the slots; the body comprises a first side surface and a second side surface opposite to the first side surface, the second side surface is closer to walls of the hear sink than the first side surface; the LED driving power is fixed on the first side surface, and a first gap is defined between the second side and perimeter walls of the heat sink.

* * * * *